Jan. 5, 1954   A. F. PIERCE   2,664,927
PANEL TRIM APPARATUS WITH ORIENTING FEED MEANS
Filed May 23, 1949   9 Sheets-Sheet 2
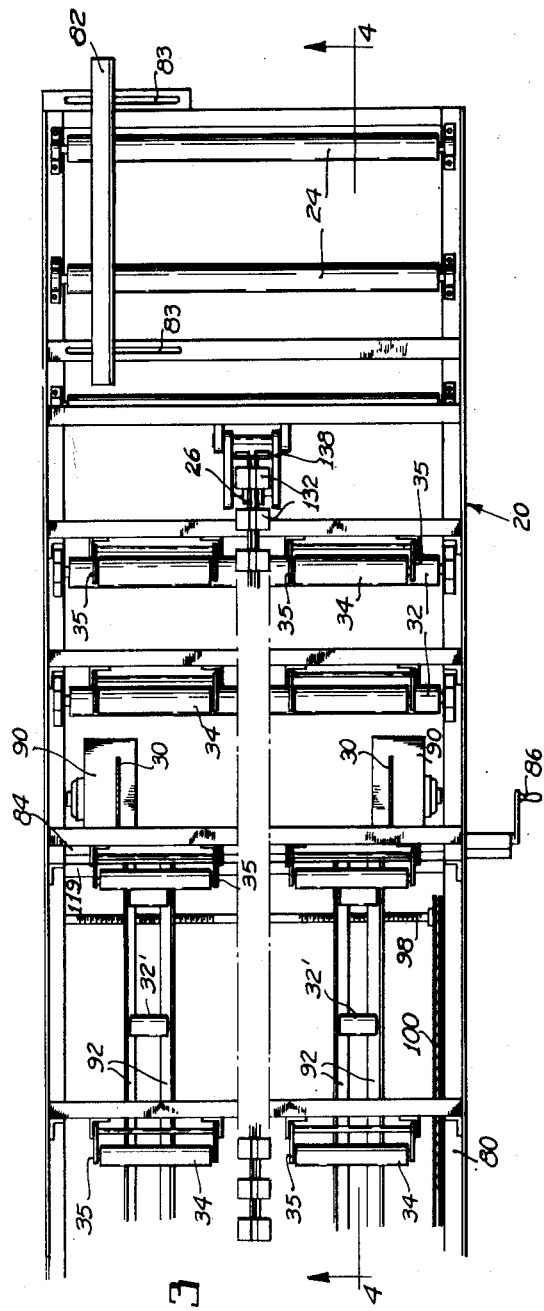
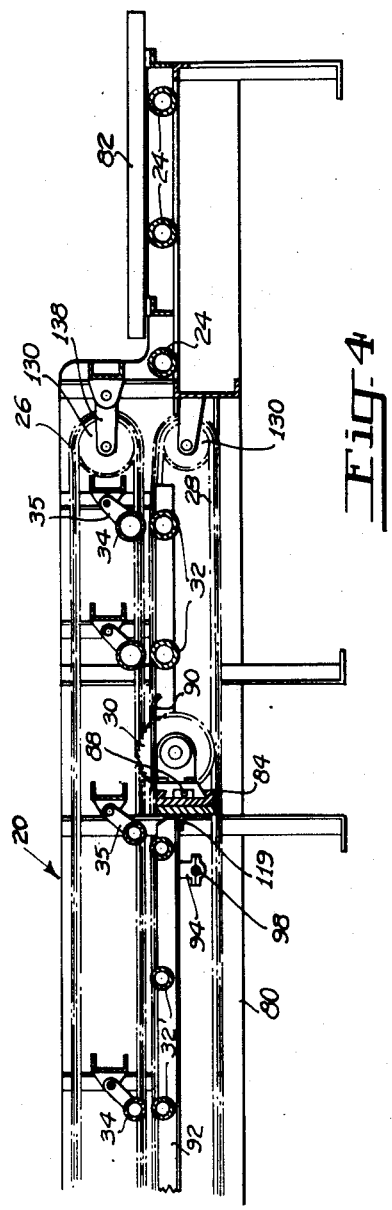
INVENTOR.
ALFRED FRANK PIERCE
ATTORNEYS
REYNOLDS & BEACH
BY Robert W. Beach Jan. 5, 1954　　　　　A. F. PIERCE　　　　2,664,927
PANEL TRIM APPARATUS WITH ORIENTING FEED MEANS
Filed May 23, 1949　　　　　　　　　　　　9 Sheets-Sheet 3
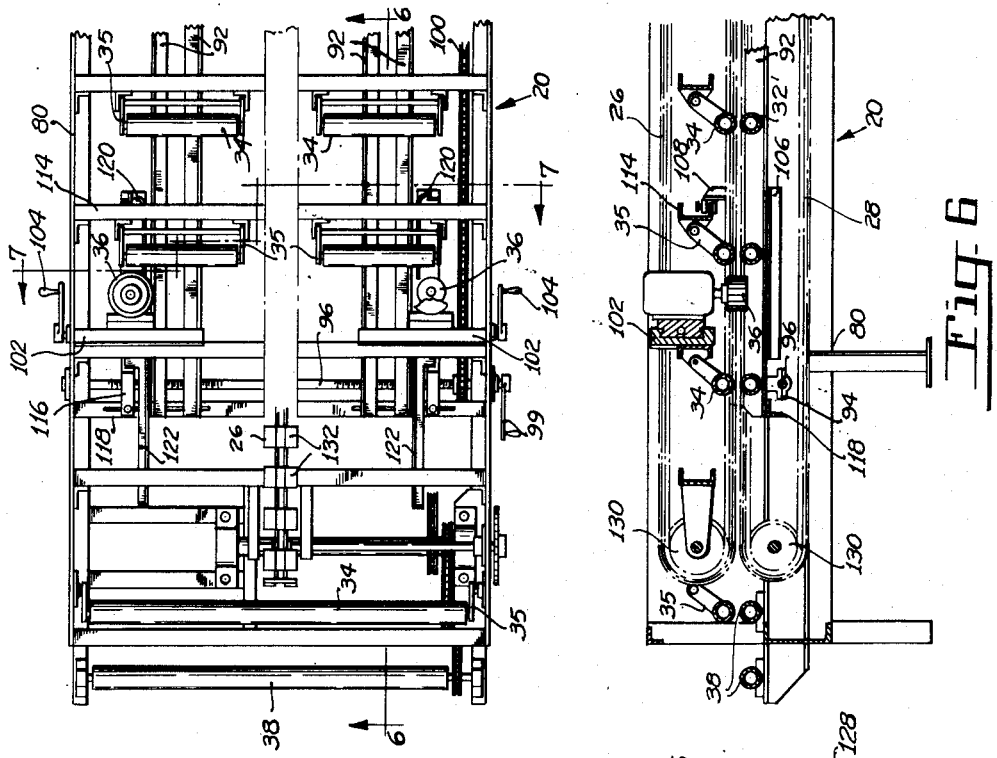
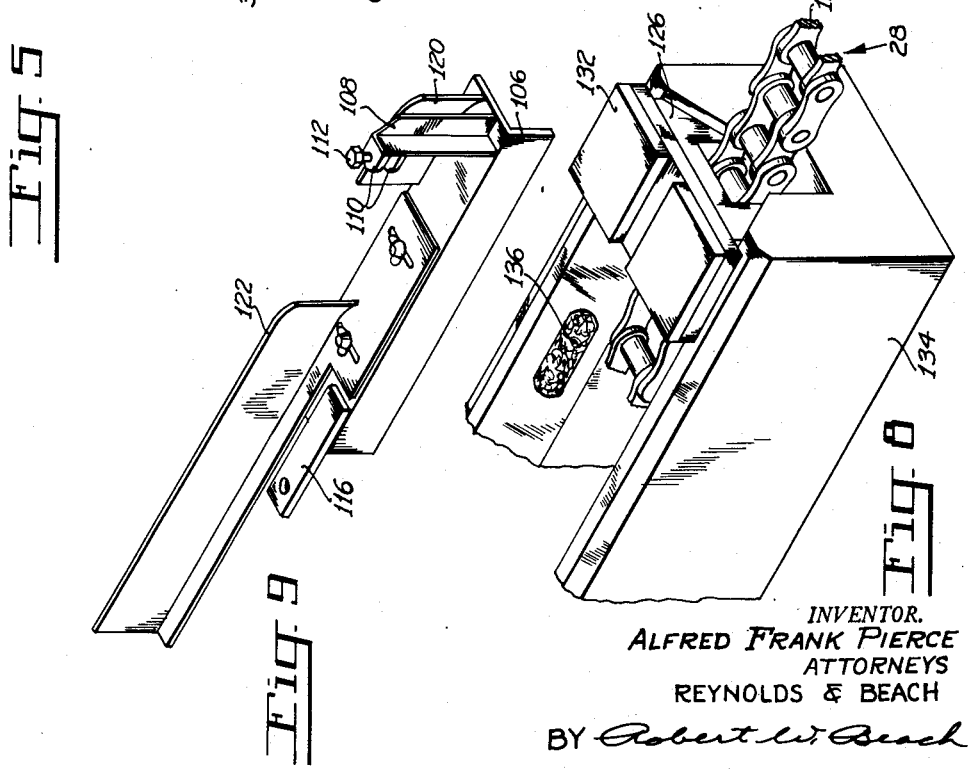
INVENTOR.
ALFRED FRANK PIERCE
ATTORNEYS
REYNOLDS & BEACH
BY Robert W. Beach Jan. 5, 1954  A. F. PIERCE  2,664,927
PANEL TRIM APPARATUS WITH ORIENTING FEED MEANS
Filed May 23, 1949  9 Sheets-Sheet 4

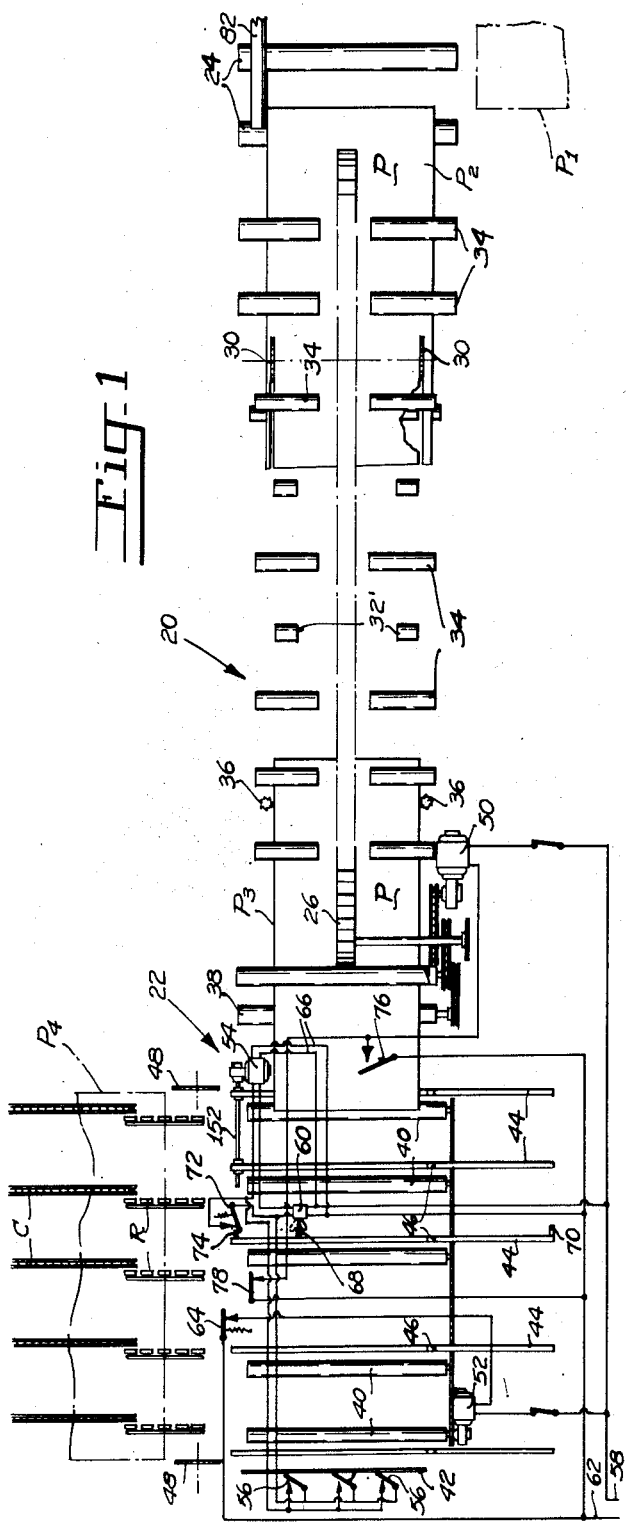

INVENTOR.
ALFRED FRANK PIERCE
ATTORNEYS
REYNOLDS & BEACH
BY Robert W. Beach

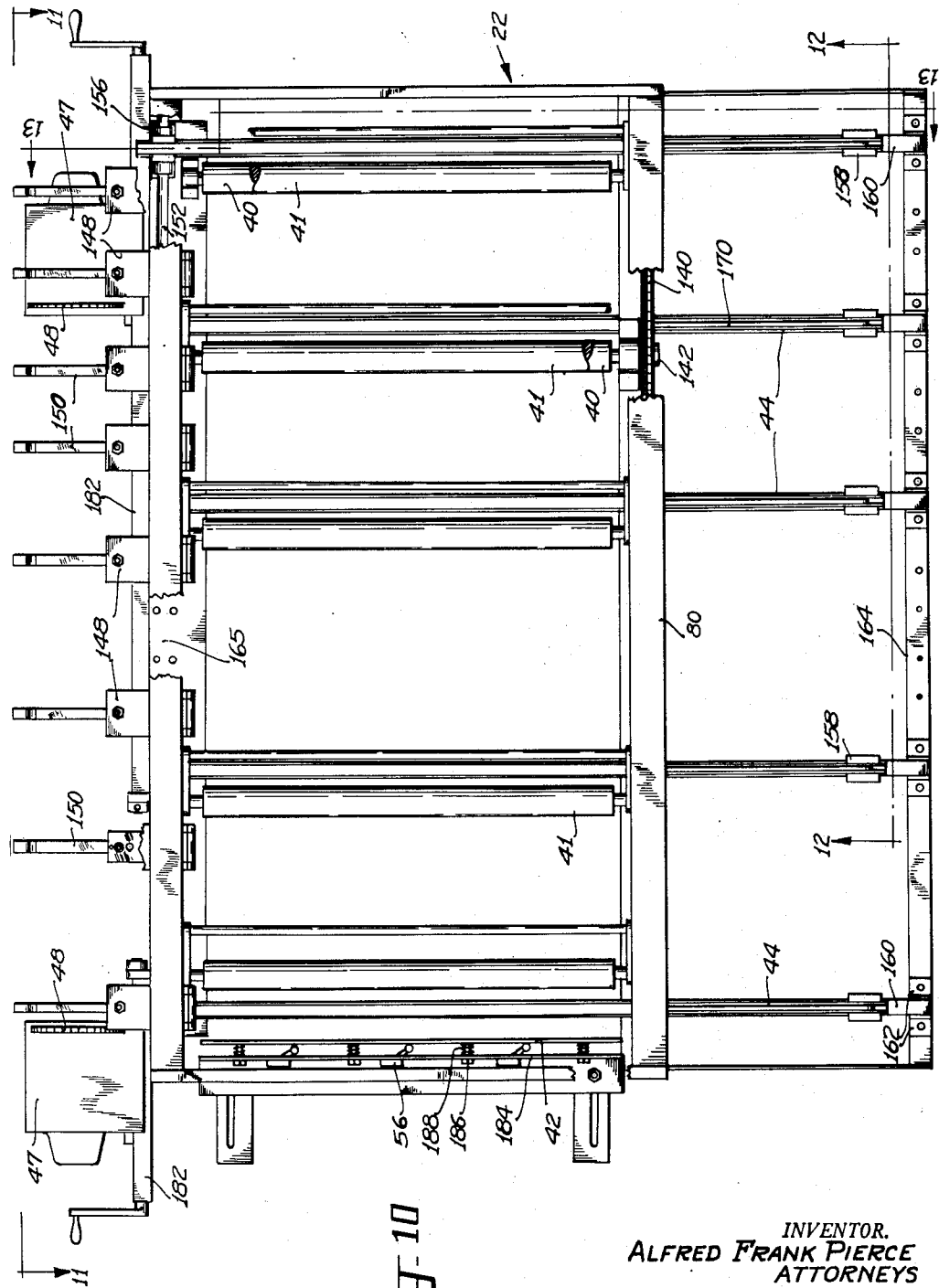

Jan. 5, 1954 A. F. PIERCE 2,664,927
PANEL TRIM APPARATUS WITH ORIENTING FEED MEANS
Filed May 23, 1949 9 Sheets-Sheet 6

INVENTOR.
ALFRED FRANK PIERCE
ATTORNEYS
REYNOLDS & BEACH

BY Robert W. Beach

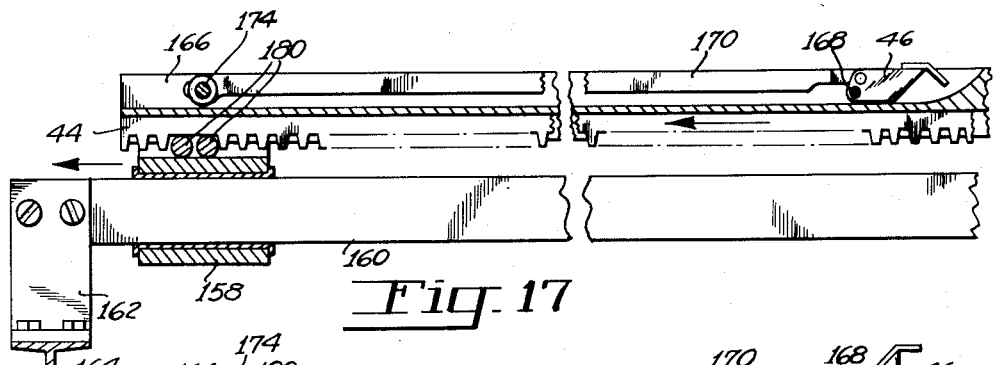
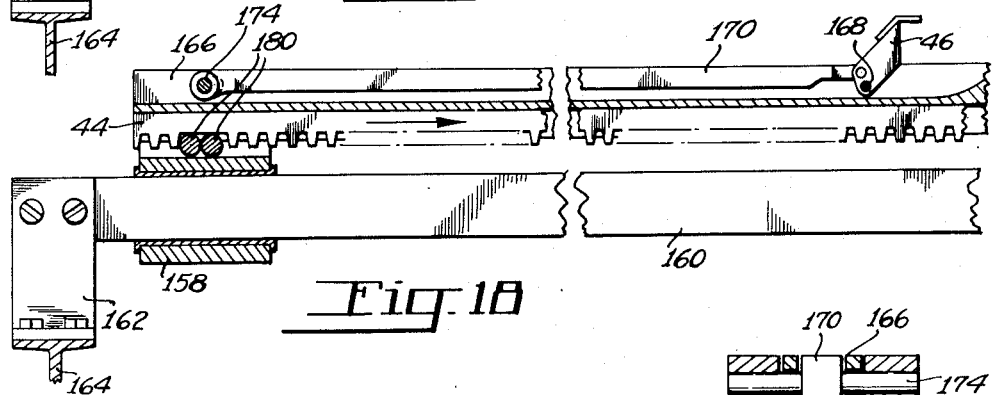
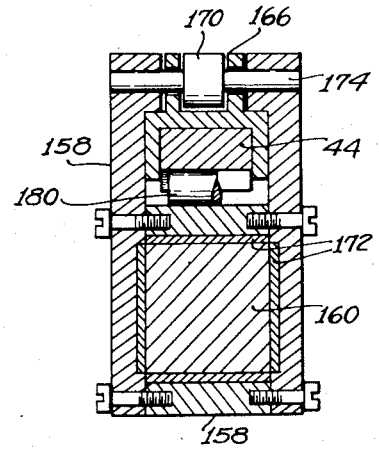
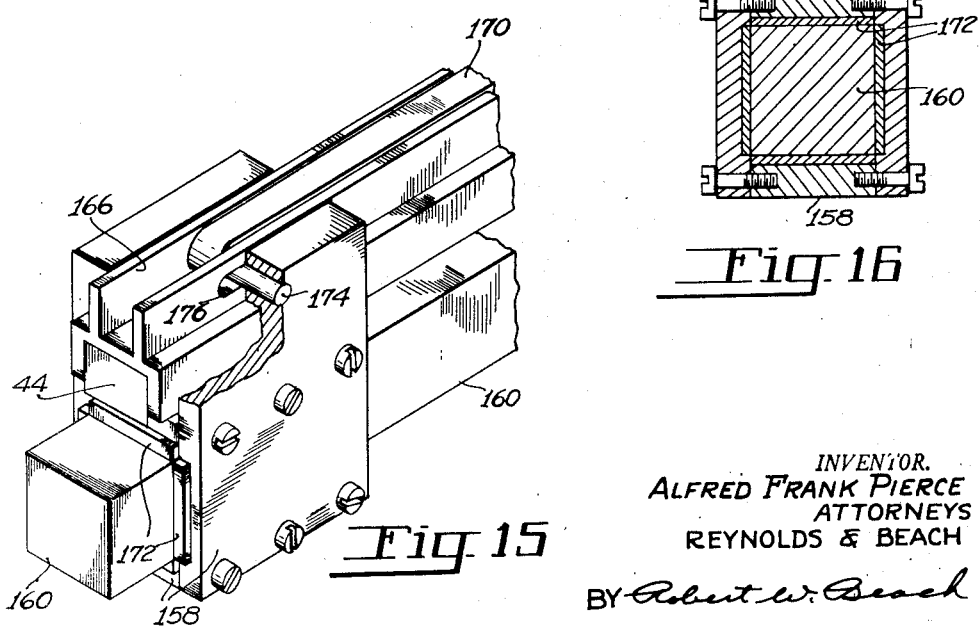

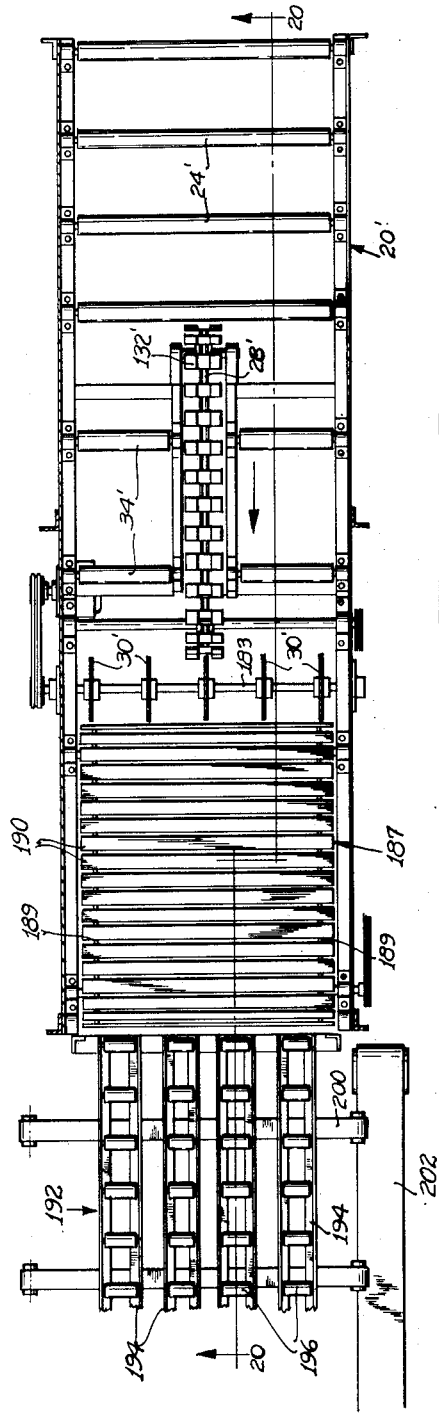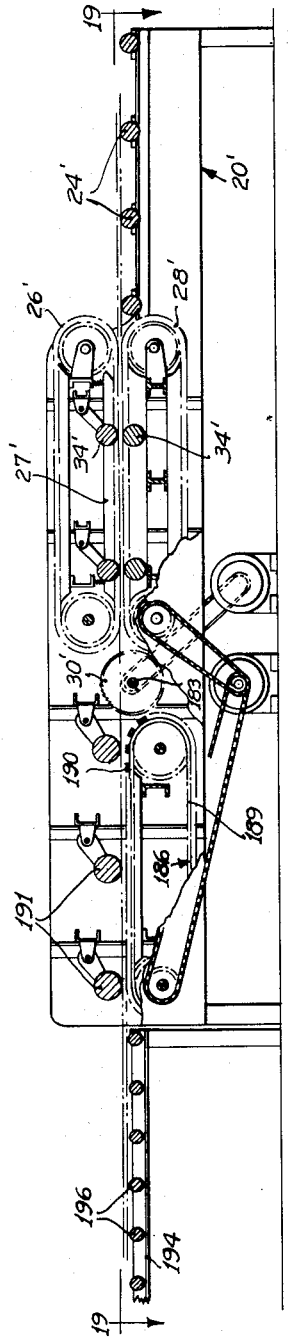

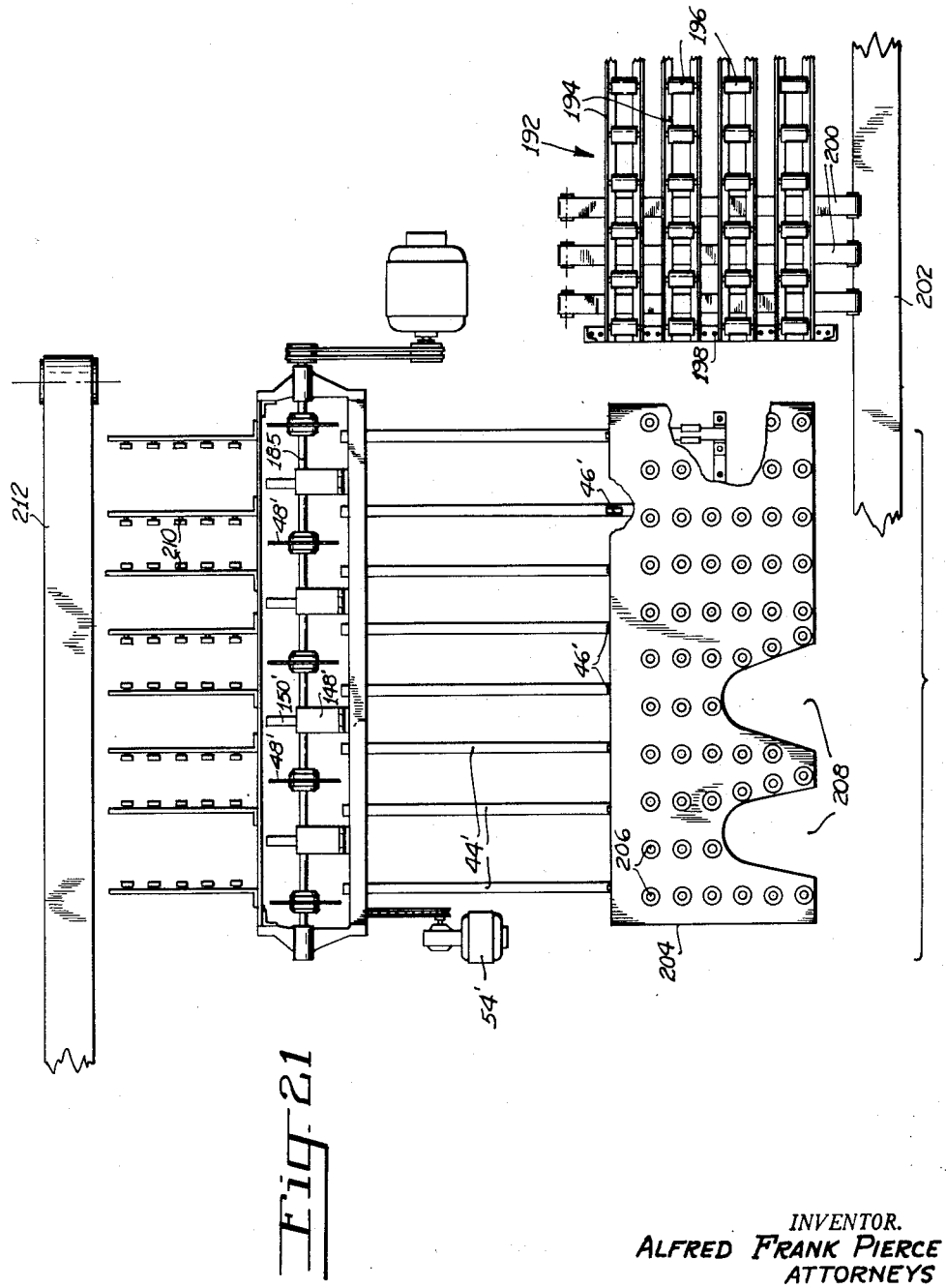

Patented Jan. 5, 1954

2,664,927

UNITED STATES PATENT OFFICE 2,664,927

PANEL TRIM APPARATUS WITH ORIENTING FEED MEANS

Alfred Frank Pierce, Tacoma, Wash., assignor to American Manufacturing Company, Inc., Tacoma, Wash., a corporation of Washington Application May 23, 1949, Serial No. 94,773

4 Claims. (Cl. 143—49)

The present invention concerns apparatus for the cutting or edge trimming of panels, and is herein illustrated by reference to the cutting and trimming of plywood panels. General purposes of the invention include providing a machine which is automatic and rapid in operation, one which affords precision control of panel dimensions, and one which produces panels which are accurately rectangular in form. Such a machine is intended primarily to meet the needs of plywood and millwork factories, for example, where the work is frequently large and difficult to handle by ordinary machines and methods, although a number of other applications thereof will be immediately apparent. Accordingly, the invention is herein illustrated in one form by reference to its application in trimming of plywood panels, and in another form both to the sectional cutting and trimming of such panels, it being at the same time understood that the illustrated apparatus and application are merely representative, however.

In manufacturing plywood, final trimming of the laminated panels is reserved until the constituent veneer sheets are first stacked and permanently bonded together. Such a practice avoids critical cutting and handling of the flimsy sheets and simplifies stacking and bonding them. Any burred edges received during the preliminary handling of the oversize veneer sheets are readily removed during final trimming of the panel to provide a smooth edged finished product. Since at the initiation of this operation, the panels are somewhat irregular in size and have rough edges it becomes a problem to effect relative linear movement of the panel and trimming tool in trimming the panel.

Accordingly, it is an object herein to provide a panel cutting or trimming machine which operates with the requisite speed and precision independently of any initial true guiding edge on the panel. According to the invention, as panels are presented to the machine they are caught and held at locations between their opposite edges, initially to be trimmed, by cooperable members of a first conveyor. While held fixedly oriented between such members the panels are advanced individually for cutting and trimming, the spaced cutting tools being stationed at the sides of the conveyor, or, in another form, at intermediate locations as well, to cut the panel into sections of desired size. Immediately thereafter the panel is engaged by further conveyor means which advances it in a new direction, oriented with its previously cut edges accurately at right angles to the new line of advance for trimming of the remaining opposite panel edges and performing further cuts at intermediate locations if desired. The entire operation is automatically executed. In the illustrated case, it requires only that the panel be presented initially to the machine with approximate positioning and orientation with relation to the first conveyor.

Further features of the invention relate to the combination of adjustable trimming tools and panel-conveyor mechanism, such that the tools may be adjusted for operating upon panels of different size without requiring positional adjustment of the cooperable conveyor members. The conveying mechanism for the first stage of cutting or trimming includes cooperating upper and lower endless conveyors of the belt type, each having a plurality of spaced, padded work-engaging elements, preferably in the form of blocks, and element-supporting track means guiding such elements for movement accurately in a straight line, and work-supporting and hold-down roll mechanism cooperable with such endless conveyors and including series of laterally shiftable panel-edge supporting rolls adjustable, in one illustrated form, for a purpose to be described. The conveyor mechanism operable to convey panels for the second stage of cutting or trimming, comprises a novel conveyor rack and feed dog assembly. In the first-described form of the apparatus, the combination of first stage and second stage conveyors incorporates an intermediate roll type conveyor facilitating automatic transfer of the panels between the first stage and second stage conveyors in a manner to be described, and automatic electric control means operable to coordinate the different conveyors to avoid work blockages caused by the panels colliding or piling up at critical or transfer points. In the second-described form, the first stage conveyor preferably terminates slightly short of the first cutters, and cooperable conveyor means takes the work emerging from these cutters for further advancement, as will be described.

These and other features, objects and advantages of the invention will become further apparent from the following description based upon the accompanying drawings. In considering this description it should be appreciated that the apparatus disclosed is subject to a number of variations in form without departing from the principles involved.

Figure 1 is a diagrammatic plan view of the entire machine, showing, in simplified form, only primary operating parts, including a preferred automatic electric control system. Figure 2 is a diagrammatic side elevation view of the apparatus illustrated in Figure 1, omitting the electric control features.

Figure 3 is a plan view of a portion of the machine adjacent to its panel feed end, and including the first stage conveyor and associated cutter means. Figure 4 is a longitudinal vertical sectional view through the same portion of the machine, taken on the line 4—4 of Figure 3.

Figure 7:
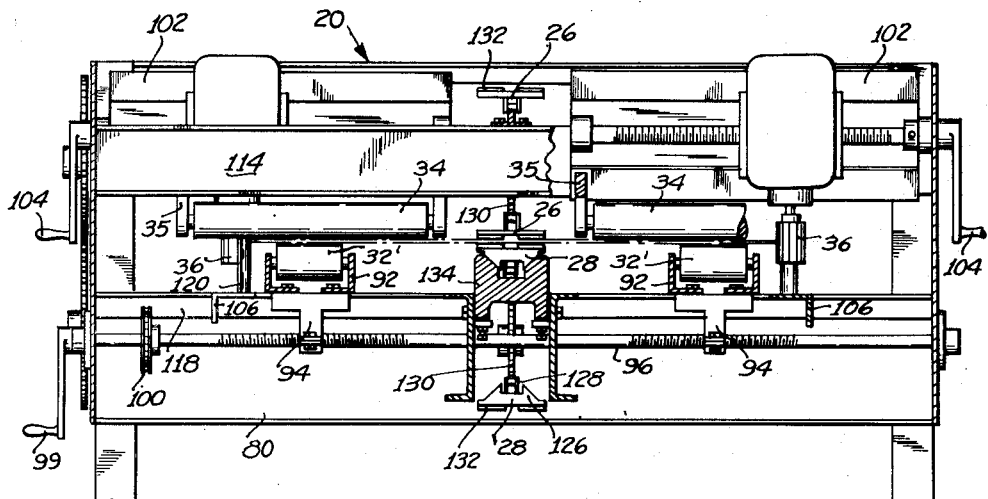

Figure 5 is a plan view of the adjoining or succeeding portion of the machine, showing the panel discharge end of the first stage conveyor and edge-finishing tools auxiliary to the primary cutter means of Figure 3. Figure 6 is a longitudinal vertical sectional view of the same machine portion, taken on the line 6—6 of Figure 5. Figure 7 is a transverse sectional view taken on the line 7—7 of Figure 5.

Figure 8 is an isometric detail view of a short section of the lower transport belt of the first stage conveyor, and a fragment of its supporting and guiding track.

Figure 9 is an isometric view of edge-guide means for a panel fed between the auxiliary edge-trim tools shown in Figure 5.

Figure 11:
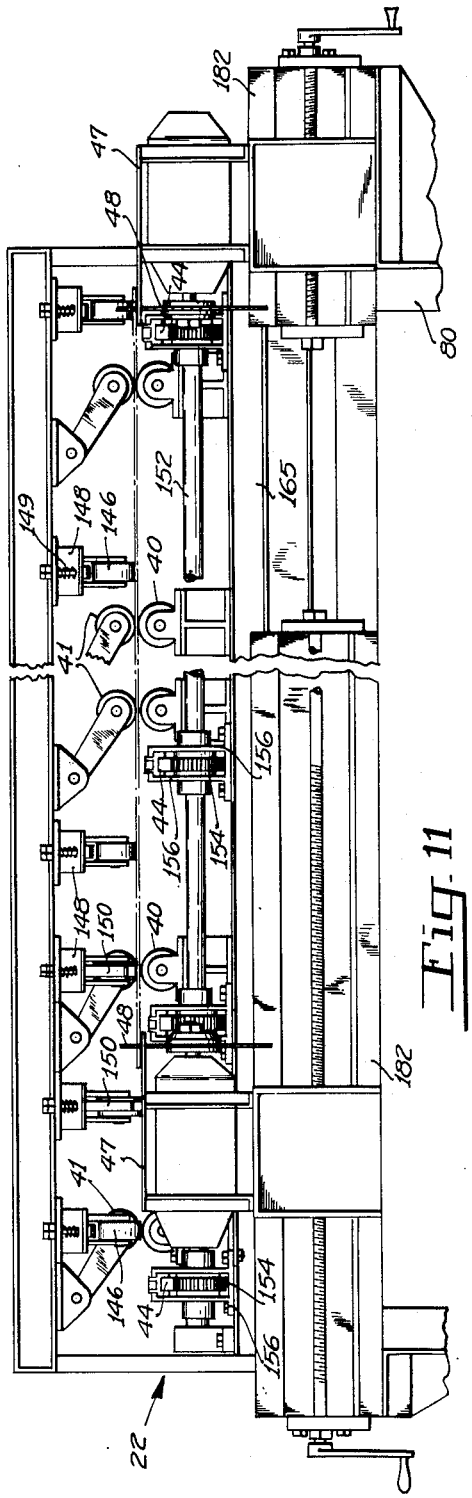

Figure 10 is a plan view of the second stage main section of the machine, that which cuts the remaining untrimmed edges of a panel which has previously passed through the side-trim section illustrated in preceding figures. Figure 11 is an elevation view of the same section of machine, as seen from its discharge end, at line 11—11 of Figure 10.

Figure 13:
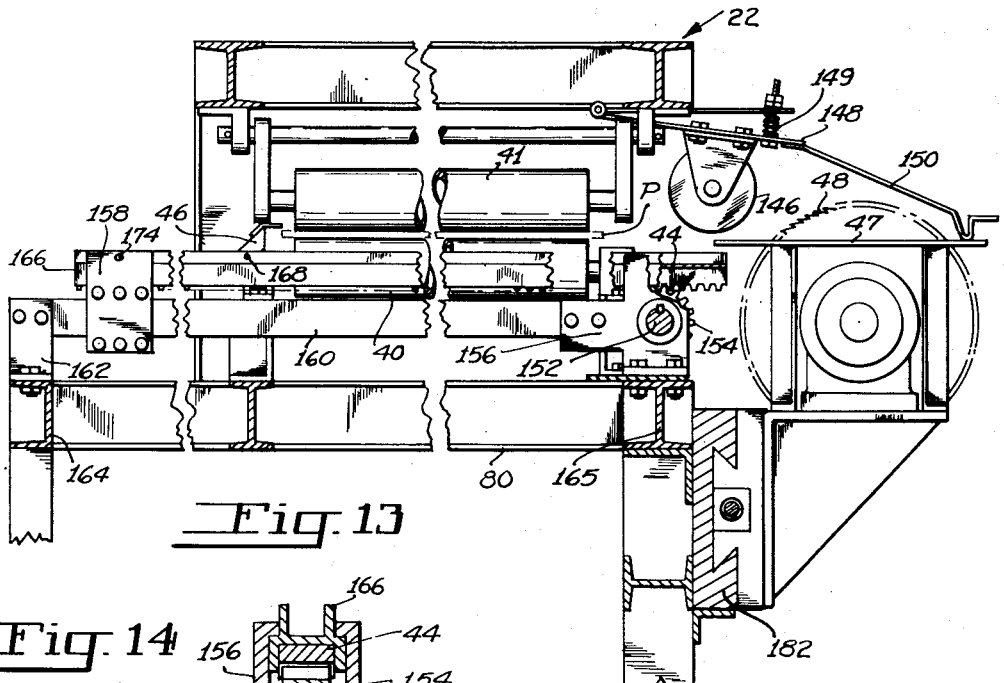
Figure 12:
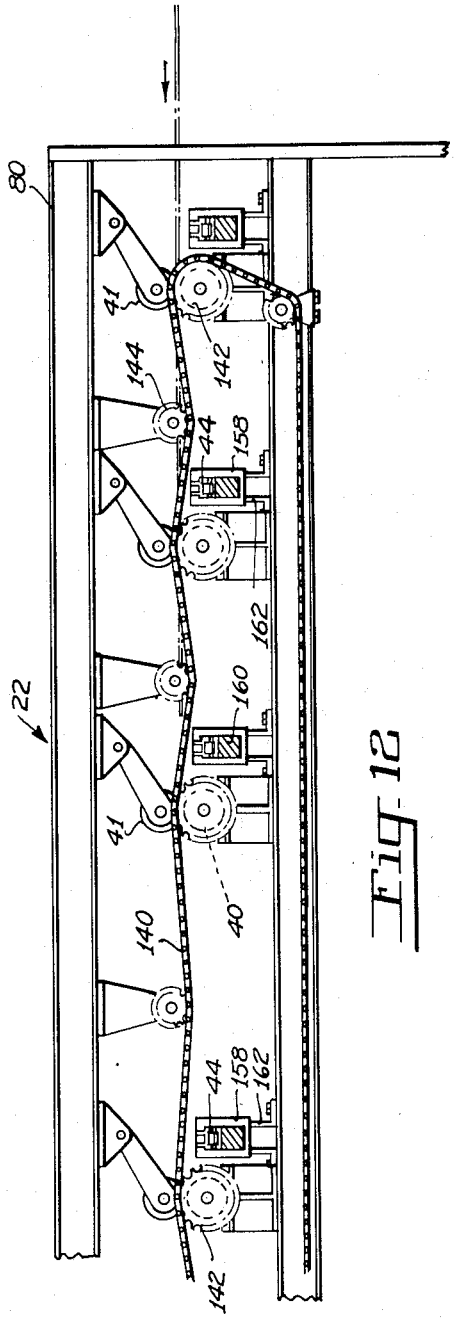

Figure 12 is a vertical sectional view showing the drive roll mechanism of an intermediate or transfer conveyor mounted on the second stage trim unit shown in Figure 11, the view being taken on the line 12—12 of Figure 10. Figure 13 is a vertical sectional view of the same portion of machine, taken on the line 13—13 of Figure 10.

Figure 14:
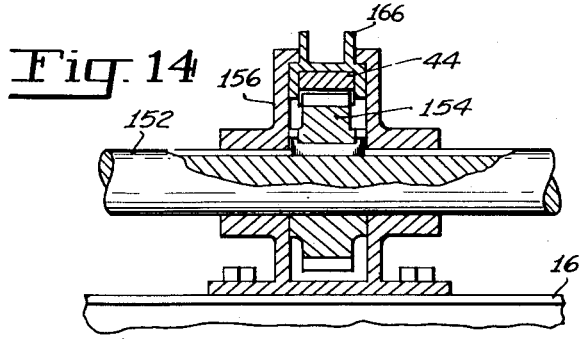

Figure 14 is a fragmentary vertical sectional view of one of several conveyor racks which constitute coacting elements of the second stage conveyor, operable to carry the panels from the intermediate conveyor of Figure 12, for final trimming. Figure 15 is an isometric view of a fragmentary end portion of one of the second stage conveyor racks; Figure 16 is a transverse sectional view of the same; and Figures 17 and 18 are operational vertical longitudinal sectional views thereof, showing the feed dog in respectively different operating positions.

Figure 19 is a horizontal sectional view of the first-stage portion of a modified form of the apparatus, taken on line 19—19 in Figure 20; Figure 20 is a side elevation of the same; and Figure 21 is a plan view of the final-stage portion of the modified apparatus.

For convenience in description and illustration, the machine may be regarded as incorporating first stage and second stage sections, which function sequentially, and together constitute coacting mechanism automatic in its over-all operation. The first stage section of the machine, particularly in its first-described form, is termed the side trim unit, designated 20 in Figure 1. In it the opposite side edges of the panel are trimmed accurately parallel as a first operation of the machine. The second stage section, designated 22, is termed the end trim unit. This unit receives panels immediately following trimming by the side trim unit 20 and trims their remaining rough edges. In principle, and as far as the sawing operation is concerned, it is immaterial which of the units trims the longer edges of the panel since the relative operative spacings of the respective sets of saws in the two units is merely a matter of selection in design. In addition, as illustrated, these spacings are also adjustable at will, but the cutters in one section are more widely adjustable than are the cutters in the other section. The manner in which the units cooperate, the means interconnecting them and the automatic coordination and control of their operation will be described in full detail at appropriate points hereinafter. The first order of description is to point out the general functioning of the machine as a whole, its automatic control, and finally certain mechanical features and details of the machine.

As shown in Figure 1, the course or path of movement of a plywood panel P traveling through the machine is illustrated by the successive panel positions P1, P2, P3 and P4. At position P1 part of a panel, shown in broken lines, is about to be laid on the idle supporting rolls 24 with its edge laid against or adjacent to the edge guide 82, ready for presentation to the first stage section conveyor. Such a conveyor preferably comprises the upper and lower endless feed belts 26 and 28, respectively, which engage the panels over a narrow zone. The edge guide 82 is positioned laterally with relation to the belts so as to cause the panel to be engaged by them approximately mid-way between its opposite side edges for endwise advance between the spaced side-trim saws 30. During such advance of the panel by the conveyors, it is clamped between the conveyor belts and held fixedly oriented by them, and since these belts are guided for movement accurately in a straight line, the resulting trimmed edges of the panel are true and parallel.

The marginal portions of a panel being advanced by the conveyor, which are not supported by the lower conveyor belt 28, rest upon the opposite groups of supporting rolls 32 arranged in series parallel to the belt. Correspondingly located hold-down rolls 34, cooperable with the supporting rolls 32, press the panel down against the supporting rolls during the trimming operation. Further groups of supporting rolls 32' arranged in line with the groups of rolls 32 substitute for the latter rolls in supporting the panel after it emerges from the trimming saws. The rolls 32' are shorter than the rolls 32 and are mounted for endwise adjustment laterally of the machine in order that their outer ends may be located just within the plane of the adjacent saws 30 at the respective sides of the conveyor belt. Consequently, strips sawed from the panel edges are free to drop past the outer ends of these rolls and away from the machine, either into piles whereby they will cause no obstruction or into suitable refuse conveyors. In position P2 (Figure 1) a panel is shown in the process of being cut by the saws 30, the adjusted location of the rolls 32' with relation to the saws being likewise evident in that figure.

If desired, the side edges of the panel cut by the saws 30 may be regarded as finished, and the panel then advanced directly to the second stage section or edge trim unit 22 for trimming of its remaining opposite edges. However, it is usually desirable to joint the sawed edges of the panel, especially where the line of cut is parallel to the length of the panel and to the grain of the outer layers of wood veneer making up the panel, since such edges are the ones usually assembled in edge-abutment with the edges of other panels in constructions for which the panels are used. For this purpose jointer heads 36 are mounted on the side trim units at corresponding locations spaced beyond the respective saws. In position P3, a panel is shown passing between the heads 36, which panel is located in advance of the discharge ends of the first stage conveyor belts 26, 28. As the panel is discharged from between the belts, feed rolls 38 assist in advancing it onto the driven rolls 40. The latter rolls constitute a conveyor for transferring the panels from the first stage conveyor to the second stage conveyor, and which continues to urge the panel in the same direction as it is carried by the first stage conveyors until it strikes a switch rail 42 and is thereby stopped.

When the switch rail 42 is engaged by a panel in this manner, such rail automatically actuates control means operable to energize operation of the feed racks 44 comprising the second stage conveyor. The several feed racks, parallel to such rail, have individual retractible dogs 46 which at that time are elevated to engage behind a trimmed side edge of the panel. These dogs advance the panel for final trimming between saws 48 with such side edge oriented accurately at right angles to the line of movement. Such line of movement in the illustrated case is shown at right angles to the line of panel movement effected by the first stage conveyors. However, this latter angular relationship is not critical, since it is the proper orientation of the aligned feed dogs with relation to the line of movement of such dogs which determines the accuracy of cutting the edges of the panel during the second stage at a true right-angle relationship to its finished edges. Having passed the final end trim saws 48, the finished panel emerges at the position P4, shown in the diagram of Figure 1.

For achieving the desired automatic machine operation in the preferred case, the several conveyors are power driven by separate electric motors. Thus, one or both of the conveyor belts 26, 28 are energized or driven by the electric motor 59. The auxiliary feed rolls 38, coacting with the feed belts 26 and 28, are conveniently driven by the same electric motor 50, as drives such belts, through suitable chain-and-sprocket drive mechanism, as shown. The transfer rolls 40 are driven by the electric motor 52; the second stage panel conveyors, comprising gear racks 44, are reciprocated by pinions 154 (Figure 13) driven by the electric motor 54 turning shaft 152 (Figure 1).

Initial impact of an advancing panel on the switch bar 42 deflects the latter and thereby causes actuation of one or more of the parallel connected switches 56 mounted behind it. Closure of any one of these switches completes the energizing circuit for the feed rack motor 54. As shown in Figure 1, the motor circuit includes a supply lead 58, one side of reversing switch 60, the control winding of motor 54, the impact-closed control switches 56, connected in parallel, the other side of the reversing switch 60, and finally the opposite supply line 62. Although the racks 44 are then set in motion, conveying a panel for the second stage trimming operations, the conveyor belt motor 50 will normally continue to operate to advance a succeeding panel into position for transfer to the feed racks 44 at an appropriate later time, subject to operating conditions which will be discussed later in more detail.

Motor 52, driving the intermediate or transfer conveyor rolls 40, continues to operate for a short period of time following initial energization of the feed rack motor 54 and during initial feed reciprocation of the racks. During this short period of continued operation the rolls 40 prevent the panel from being slued about first by one feed dog and then another to swing the panel from side to side until finally all the feed dogs have uniformly engaged the side edge of the panel and commenced advancing the panel toward the saws 48. The action of the rolls steadies the panel and expedites the contact of all the racks with the panel edge.

In addition, the continued pressure of the panel urged by the rolls 40 against the switch bar 42, maintains at least one of the switches 56 closed until the feed racks have advanced a distance sufficient to close switch 72 which then holds the energizing circuit for the motor 54. At this time or shortly thereafter a switch 64 is opened by the panel to deenergize the roll motor 52. Thereafter the rolls 40 remain deenergized until such time as the advancing panel moves beyond the actuating element of the switch 64, when such switch will reclose for energizing the motor 52 again. During return movement of the racks 44, the feed dogs 46 retract beneath the plane of the succeeding panel advancing over the rolls 40 toward the switch rail 42. The feed racks and associated dog mechanism are described subsequently in detail.

In the operating position of the rack and control mechanism shown in Figure 1, the feed dogs 46 are at their initial position ready to advance a panel toward the saws 48, the reversing switch 60 being at that time conditioned to energize the control winding of motor 54 in proper electrical phase or polarity to cause movement of the racks forwardly. The motor 54 is of the reversible type, such as a split-phase induction type motor having a reference field winding energized through leads 66 and a control field winding energized through the circuit including reversing switch 60 and control switch 72, as described.

The reversing switch is oppositely actuated at the respective ends of travel of the racks by suitable rack projections 68 and 70 which engage an arm or contact element of the switch 60. Preferably suitable time delay means are embodied directly in the switch 60, or provided separately, to allow time for the motor 54 to come to rest before reversal of its rotation by reversing the phase of its control winding through switch 60. The control switch 72 is opened by the actuating element 74 to deenergize the motor 54 when the racks have returned to initial position. The motor then remains deenergized until subsequent closure of one of the switches 56 by a succeeding panel striking the switch rail 42. The operating cycle of the racks is then repeated.

An electrical interlock is provided to prevent panels from being discharged by the conveyor belts 26, 28, which would interfere with a panel already on the feed racks 44. However, when no such interference is imminent, it is desirable that the motor 50 continue to drive the conveyors 26 and 28 and rolls 38 to advance a succeeding panel up to the transfer rolls 40 ready for the second stage trimming operation the instant the panel carried by the feed racks has cleared the transfer rolls. Such operation is obtained by the use of two normally-closed switches 76 and 78, connected in parallel in one lead of the energizing circuit for motor 50, and capable of being opened by panels. Switch 76, located at the discharge end of the conveyor belts 26 and 28, is opened by a panel moved by them onto the approach to the transfer rolls 40, and is released to close when the panel is fully on such rolls. Switch 78, located in the line of advance of a panel on the racks 44, is opened by a panel carried by such racks and advanced slightly by them along the second stage trim path. This switch is held open until such panel is moved clear of the transfer rolls 40.

If either one or both of such switches 78 and 76 are closed, the motor 50 will be energized to drive the first stage conveyors 26 and 28. However, if both of the switches are opened, which will happen when a panel reaches the threshhold of the rolls 40 and another panel on the racks 44 has not yet cleared such rolls, so that interference would be caused by further advance of the former panel by the first stage conveyors, the motor 50 will be deenergized. It will resume operation, however, the instant switch 78 again closes as the panel undergoing the second stage trimming operation is advanced by the racks 44 through the saws 48 or at least off the rolls 40. As the racks return to their starting position, the next panel will be fed onto the rolls 40 by conveyors 26 and 28.

Referring now to Figures 3 to 6, inclusive, particular details of the frame structure, generally designated as 80, are merely incidental to the operation or form of the machine and should therefore require no particular description. The supporting rolls 24 (Figures 3 and 4) and the panel gauge or guide 82 are shown mounted at the head or panel-receiving end of the side trim unit. The lateral position of the gauge 82 along slots 83 receiving the anchor bolts of such gauge, is adjusted at will in accordance with the width of panels being trimmed at any particular time. Normally the gauge will be adjusted to locate the center line of the panels generally in the common vertical plane of the conveyor belts 26, 28, or as near as practicable thereto.

The conveyor belts 26, 28 are of special construction, being illustrated in their preferred form, although it is to be understood that modified conveyors operable to grip the veneer faces may be substituted. These belts are made up of a plurality of padded elements or tread blocks 126 carried by an endless chain 128 at spaced intervals along it, as shown in detail in Figure 8. The opposite ends of the respective chain loops of the two belts run on the two pairs of sprockets 130 appearing in Figures 4 and 6, the upper and lower conveyor belt chains being driven synchronously by the same drive motor 50 through suitable power transmission means. The tread blocks 126 of the upper and lower conveyor belts cooperate, respectively, generally in pairs of upper and lower blocks to hold the panels firmly between them. Pads 132 of rubber or similar material cover the work-engaging faces of the blocks to enhance the frictional holding force of the belts on the panel. At any one given time a panel may be engaged by as many as twelve or more of such tread block pairs, depending on the panel's length. With the hold-down force of the upper belt exerted on a panel by the weight of the upper belt assembly, there is little tendency for the panel to swing out of initial alignment while between the belts. The idler sprocket 130, carrying the feed end of the upper belt, is shown in Figure 4 mounted on a swinging arm or link 138 pivoted to the machine frame to allow the belt to rise and fall with varying thickness of panels, and to apply the weight of the upper belt assembly to panels carried by the lower belt.

The work-engaging treads 126 of the lower belt 28 are guided for linear movement with their work-supporting pads in a common plane. For this purpose, as shown in Figure 8, the reverse sides of the tread elements of such belt are wedge-shaped to engage in the V-groove of a track 134. The belt or chain 128 is pinned to each tread element in a notch formed centrally at the apex of the wedge, and the bottom of the groove in track 134 is deepened to accommodate the upper stretch of the chain 128.

The saws 30 are mounted on separate carriages which include suitable power means and the saw tables 90. As shown in Figure 4 the carriages have dove-tailed slides received in dove-tail grooves in tracks 84 for positional adjustment of the carriages laterally of the machine. The position of a carriage along its track 84 is controlled by rotation of a manual adjusting handle 86 for turning a lead screw 88. Preferably the saws are located by such means at equal distances from the center line of the conveyor belts 26 and 28, thereby minimizing any tendency for the panel to swing in its own plane between the belts during the trimming operation. Pressure, creating friction of the belt upon the panel, resists such a tendency and maintains the panel steadily in its initial orientation with relation to its line of advance. For this purpose the upper belt 26 acts as a hold-down device for panels supported on the lower belt 28.

As mentioned, the groups of supporting rolls 32 and 32', shown in Figures 2 and 4, journaled in the machine frame beside the conveyor belts 26 and 28 to support the marginal portions of the advancing panels carried by the belt during side trimming, coact with corresponding hold-down rolls 34 above the panel. These latter rolls are carried by arms 35 swingable about horizontal axes to accommodate panels of different thickness without having to set a special adjustment of such rolls for each particular panel thickness. In addition, the supporting rolls 32', arranged in sets, one set on each side of the conveyor belts, are made adjustable in position laterally of the machine in order to locate their outer ends inside the trimmed side edges of a panel moved past the saws 30, as seen in Figure 1.

For this purpose all the rolls 32' in each set are mounted in an adjustable frame 92 shown in Figures 3, 5 and 7, which includes two parallel elongated angle iron members extending lengthwise of the side trim units and having their ends supported for transverse sliding on suitable support bars 118 and 119, respectively. Yokes 94 interconnecting the angles of each pair of such members at their respective ends have nuts on their lower ends threadedly engaging the lead screws 96 and 98, respectively. To effect simultaneous adjustment of the two frames on opposite sides of the machine toward and away from each other, the threads of screws 96 and 98 are formed reversely over their portions engaging the respective frames. Simultaneous positional adjustment of both frames is thereby obtained by rotating the control handle 99 of Figure 7, chain and sprocket drive mechanism 100 shown in Figures 3 and 5 effecting conjoint rotation of the screws 96 and 98 to maintain the respective frames in parallel relation during their lateral adjustment.

Like the trim saws 30, the jointer heads 36 also slide in tracks extending transversely of the machine, and each jointer head carriage, carried by a dovetail mounting on a track 102, as shown in Figures 5 and 6, is actuated by a separate lead screw, each rotatable by its control handle 104. Preferably, and as illustrated in Figure 1, the jointer heads are mounted on the machine at corresponding locations spaced beyond the saws 30 a distance somewhat in excess of the length of panels advanced by the conveyor belts 26 and 28.

To shorten the length of the side-trim unit as much as possible the discharge end of the conveyor belts 26 and 28 lies only a short distance beyond the jointer heads 36, such that panels partly emerge from between the belts before jointing of their edges is completed over their entire length, as shown in Figure 1. Consequently, the use of additional means to prevent disalignment of the panels during jointing of their edges is desired, shown as panel edge guides located in the vicinity of the respective jointer heads to hold advancing panels steadily oriented.

Each of the panel edge guides adjacent to the respective jointer heads, shown generally in Figures 5 and 6 and in detail in Figure 9, includes two guide strips, 120 and 122, one located on the feed side and the other on the discharge side of its jointer head. Both of these guiding elements are carried by a single support angle 106 which is adjustable laterally of the machine to correspond to the adjusted position of the jointer head with which it cooperates. Such support has a post 108 at one end which carries vertically spaced ears 110 straddling the horizontal flange of a fixed transverse channel-iron guide 114, as shown in Figure 6. The support 106 is locked in any adjusted position on such channel guide by a set screw 112 threaded in one of the ears 110 and bearing against the channel flange. The end of the support opposite the post 108 has an extension bar 116 which is bolt-connected to a slotted transverse guide 118 for corresponding adjustment of that end of the support (see Figure 5).

Relative adjustment of the two guide strips 120 and 122 of each guide unit transversely of the path of travel of the panels is also obtainable by mounting the element 122, for example, for sliding in relation to the support 106. Such relative lateral adjustment of the guiding elements allows for the depth of cut of the jointer heads as the panel is jointed. The panel-receiving ends of the guide strips 120 are curved outward to deflect the panels entering between them any slight amount necessary for accurate passage therebetween.

As illustrated in Figures 10, 11 and 12, the transfer conveyor rolls 40 comprise a lower group of supporting rolls which are driven in unison by a single drive chain 140 engaging roll-connected sprockets 142. Idler sprockets 144 located between the roll sprockets 142 deflect the chain in serpentine fashion to maintain its driving engagement with the roll sprockets. The panels are pressed down against the live rolls 40 by cooperating hold-down rolls 41, mounted on links, similar, for example, to the hold-down rolls 34 of the side trim units.

The individual panel-transport racks 44 of the second stage or end trim unit, carrying the feed dogs 46, are located parallel to and between adjacent driven supporting rolls 40, as seen in Figures 10 and 12. The tops of the racks 44 lie generally beneath the lower surface of a panel carried by the rolls to prevent interfering with movement of the panels by the rolls. Actually, therefore, the racks themselves do not support the panels while they are located over the rolls 40. Instead, a panel is advanced toward the saws 48 lengthwise of the rolls, and transversely of the direction of panel travel through the first stage or side trim unit, by the feed dogs 46 carried by the racks 44 but projecting above them and the upper surfaces of rolls 40 sufficiently to engage the panel's jointed side edge as the racks are reciprocated lengthwise.

The transport racks carrying the dogs 46 are reciprocated lengthwise conjointly by common rack-drive means shown best in Figures 13 and 14, including a transverse pinion drive shaft 152 carrying a plurality of rack-engaging drive pinions 154. These pinions are retained in rack-engaging position endwise of the shaft 152 between the sides of the respective housing mountings 156. The latter also serve as retainer-guides for the racks 44 sliding therein. At their remote ends the racks are supported and guided for endwise movement by frictional shoes 158 which embrace and may be slid along fixed guide bars 160 connected to the respective housings 156. The ends of such guide bars remote from the housings are mounted on angle brackets 162 bolted to a frame member 164 as shown in Figures 10, 13, 17 and 18. The housings are similarly bolted to another frame member 165 parallel to the first frame member 164.

Both frame members 164 and 165 have corresponding spaced groups of bolt-receiving apertures arranged at intervals along their lengths, as shown in Figure 10, to enable the mounted positions of the individual rack units to be altered lengthwise of such frame members for accommodating panels of different lengths. As the racks are thus shifted in position pinions 154 must likewise be moved along pinion shaft 152, which has a long keyway to receive pinion keys, permitting such relative movement of the pinions along the shaft during adjustment of the rack units.

As mentioned previously, the panels are moved off the rolls 40 by dogs 46 carried by the rack bars 44, rather than by the bars themselves. Such dogs are in projected panel-engaging position during initial panel-advancing movement of the racks, but are retracted automatically beneath the level of a panel on the rolls 40 by return movement of the racks. They are then automatically reset into projecting position for the next panel-feeding operation. While each panel is being slid lengthwise of the rolls 40, it is pressed downward against the tables 47, through which the end trim saws 48 project, by hold-down rollers 146, shown best in Figure 13, to insure that the panel will not lift and chatter as the saws cut through it. The latter rollers are carried by hinged arms 148 urged downwardly by springs 149. Each arm 148 carries in cantilever fashion a leaf spring extension 150 which acts as a stop to prevent return movement of panels advanced beyond the saws 48 and trimmed, as racks 44 are reciprocated during their return movement. For this purpose the extensions 150 are formed so that they may be forced up readily by forward movement of panels advancing past them, but snap down into stop-actuated position by passage of the panel's trailing edge past them after leaving the saws.

As shown in Figures 15 and 16 each rack has an elongated, upwardly-opening channel element 166 which may be formed as an integral part of the rack itself, or may embrace and carry the rack 44 as a fixed attachment in the manner of Figure 14. As shown in Figure 16 the sliders 158 for the racks have friction pads 172 mounted internally to engage the guide bars 160. Each shoe 158 embraces its corresponding channelled member 166, and these are interconnected by lost motion means comprising the slot-and-pin connection of Figure 15, including a pin 174 anchored in the slider 158 and projecting through aligned elongated slots 176 formed in the opposite flanges of the channelled member. A pair of rollers 180 support the gear racks upon the interior transverse wall of the slider 158 to reduce the friction during the relative movement permitted between the rack and slider by their pin and slot connection. Each feed dog 46 appearing in Figures 17 and 18, is pivoted in its channel 166 on a pin 168 at an appropriate location lengthwise of the channel. The dog is swung between a projected position and one retracted between the channel flanges by a link 170 interconnecting the dog, eccentrically of its pivot pin, and the pin 174 of its channel.

The coordination between reciprocation of the rack units and the automatic projection and retraction of feed dogs 46 may now be evident. In the initial position of the racks 44 upon completion of a retracting movement in the direction of the arrow in Figure 17, the pins 174 are lodged in the ends of the slots 176 near the dogs. As the racks move forward together at the commencement of a panel feeding stroke, driven by pinions 154 on shaft 152 turned by motor 54, each slotted channel member 166 first moves relative to the slider-retained pins 174 which are stationary with relation to the guide bar 160, in the direction indicated by the arrow of Figure 18. This results from the snug engagement of the shoe 158 with the bar 160 which causes it to move relatively stiffly along such guide rod as compared to the freedom of movement of the rack 44 relative to the shoe. Such relative movement between each channel 166 and its pin 174, representing lost motion, continues until the opposite ends of the slots 176 engage the pins positively. By this lost motion action each channel 166 also shifts lengthwise relative to its link 170, so that the dog, the pivot pin 168 of which shifts with the channel, is swung upward about such pivot. When the left ends of slots 176, as seen in Figure 18, engage pin 174, the rack and channel pushing on such pin slide shoe 158 along bar 160 while the lug 46 is maintained in its raised, panel-engaging position. Thus for the remainder of the travel of the rack in that direction the slider is moved conjointly with the rack along the guide bar.

Upon initiation of the return movement of the racks the reverse lost motion action takes place between the racks 44 and their respective shoes 158 and guide bars 160. Shifting of the rack to the left, as in Figure 17, relative to pin 174 and link 170 effects corresponding movement of the dog pivot pin 168 while the link is stationary. The dog is thus automatically swung downward into the channel 166 where it will clear the bottom of a panel advancing over the rolls 40. When the right ends of slots 176 engage the pin the shoe will thereafter be shifted with the rack in the direction indicated by the arrow shown in Figure 17 until the motor 54 is stopped by finger 68 tripping the switch 60 of motor 54.

The end trim unit saws 48 are mounted on individual adjustable carriages having projections slidably engaged with dovetail grooved tracks 182, shown in Figures 10, 11 and 13, disposed perpendicular to the path of movement of the feed racks. Normally, it would be expected that adjustment of one saw 48, such as that remote from the switch rail 42, which initiates movement of the panel for the second stage of the trimming operation, would be all that is necessary to accommodate different-length panels. However, since the racks 44 are not continuously adjustable in lateral position, because of interference by the presence of the stationary feed rolls 40, the other saw 48 is also made adjustable. Accordingly, the saw 48 mounted on the short track 182 located adjacent to the switch rail 42, establishes a shiftable reference or base line with relation to the opposite saw, the location of which reference line may be adjusted to suit the particular or most convenient setting of the feed rack units between the rolls 40 for a particular panel length, primarily so that the feed racks will engage a panel's edge at proper intervals spaced along such edge notwithstanding the presence of the rolls. Moreover, the switch rail itself is adjustable transversely of the rolls 40 and relative to the adjacent saw 48 to secure at all times the proper width of marginal cut when the general desired position of the panels on the rolls 40 has been established.

The frame member 184 supporting the switch rail 42 carries the several control switches 56 at intervals spaced lengthwise of the rail. The switches have actuating arms projecting toward the rail and which are actuated by inward displacement of the rail resulting from impact of a panel thereon. The rail is guided for such displacement by mounting bolts 186 which slide through apertures in the member 184. Springs 188 encircling such bolts return the rail to its initial position spaced from the frame member 184 when panel pressure is removed from the rail, as shown in Figure 10.

Other details of the automatic electric control system illustrated in the diagram of Figure 1 are omitted from the mechanical views since their particular mechanical form and arrangement is merely a matter of choice in design.

As a trimmed veneer panel emerges from the end trim saws 48 (Figure 1) it moves along rollers arranged in parallel series R and onto the chain conveyors C for transportation away from the machine. The chain conveyors C are driven at a rate preferably slower than that of the feed racks 44 so as to eliminate the possibility of panels, being advanced through saws 48 by the racks, being drawn ahead of the rack dogs by one or more chains moving at a faster rate than the dogs and tending to swing the panel in its own plane during cutting by such saws.

In another application of the invention to the cutting of panels the described endless belt type first-stage conveyor employing the padded elements is utilized to hold a panel fixedly oriented while advancing it through a greater number of saws spaced at close intervals for cutting the panel lengthwise into several narrow sections or strips at the same time the panel's side edges are trimmed. In the illustrated case (Figures 19 to 21) this group of saws 30', five in number, are mounted on shaft 183 at uniform spacing transversely of the first-stage section of the machine. The second or final-stage conveyor racks 44' advance the sectionalized panel, emerging from the first group of saws, in a new direction at right angles to their cut edges, and through another group of saws 48' spaced at selected intervals lengthwise of their common drive shaft 185. The saws 30' and 48' may obviously be varied in numbers and spacing to cut the panel sections or strips in the desired widths and lengths. In any case, it will be seen that the same principles of a first stage belt-type panel-clamping conveyor and succeeding rack conveyors, or their equivalent, apply in this case as in the first-described illustrated form of the invention.

Other modifications are also illustrated in Figures 19 to 21, some of which are practically desirable to accommodate the smaller cut panel strips or sections. Like or similar parts are designated with primed numerals corresponding to the earlier-described form of the apparatus. Panel-clamping belt conveyors 26', 28' are illustrated proportionately somewhat shorter in length than previously. These conveyors carry the untrimmed panel up to the location of the strip cutting saws 30', where such conveyors terminate. By terminating the belts short of these saws, one of the saws may be positioned directly in the line of the centrally located belts without interference, enabling cutting the panel lengthwise into an even number of strips or sections, or dividing it into equal parts along its centerline. Panel-supporting rolls 24' enable feeding the panels easily into the belts 26', 28', while the shorter rolls 34', at each side of the belts, co-operate in supporting the panel during its advance toward and partly through the saws 30'. The upper clamping belt conveyor is urged resiliently against the work by an elongated spring-pressed shoe 27' to insure a pressure grip of the work by these conveyors.

Once past the saws 30', the cut panel strips are supported in their emerging edge-to-edge relationship, for further advance in the same direction on another conveyor 187 comprising a wide endless belt made up of laterally spaced endless chains 189 and the endless belt formed of laterally extending metal slats 190 secured to the chains 189 at regular intervals around the chains. Hold-down rolls 191 hold the strips flatly against the conveyor 187. The elongated slats traveling sidewise afford a moving panel-strip supporting platform which carries the strips ahead to the adjustable-width, roller-surfaced supporting table 192.

On the table 192 the cut strips are further advanced while the edge trimmings from the panel drop over the adjustably spaced side edges of the table for removal by a refuse conveyor system to be described. This table is made up of a plurality of laterally adjustable roller-supporting racks 194, each carrying a series of strip-supporting rollers 196. These racks are secured at their ends to the machine frame by bolts passing through apertures 198 arranged at intervals in transverse series across the machine, the lateral position of the racks accommodating the cut panel strips being determined by the particular apertures selected for securing them in position.

In order to carry away the panel edge-trimmings dropping clear of table 192 I provide a series of spaced parallel belts 200 beneath and running crosswise of the table 192. The ends of the belts 200 project beyond the sides of the table sufficiently to catch the long edge trimmings for transporting them to a refuse conveyor 202 traveling beneath the terminal ends of the belts 200. The latter carries the trimmings to a suitable point of disposal. Equivalent refuse disposal arrangements may be made at the location of the end-trim saws, although not illustrated.

From the roller table 192 the cut strips advance to a conveyor table 204 having ball-bearing elements 206 projecting above and distributed over its general surface area to support the strips and allow them to be moved easily edgewise in any direction thereon. An operator who stands in one of the table coves 208, is thereby enabled to manipulate the panel strips received on the table 204, and roll them manually in the direction generally at right angles to their lengths, either one at a time, in groups, or all together beyond the table and over the feed racks 44'. The latter then advance the strips through the saws 48' for cutting, as previously explained.

Beyond the saws 48', the panel sections, cut to final size, move on the spaced parallel series of rollers 210, or other conveyor means, to a cross-run conveyor 212 for transporting away the completed panel sections. Preferably the supports carrying the several series of rollers 210 are mounted adjustably for positioning such individual supports generally in alignment with the corresponding adjustably positioned racks 44', to insure adequate support of each panel section cut by the adjustably spaced saws 48', regardless of dimensions.

I claim as my invention:

1. Panel transport mechanism for panel trim apparatus having two spaced trim means for trimming opposite edges of a panel, comprising an upper belt and a lower belt in vertical registry and located substantially midway between such trim means, engaging the upper and lower surfaces of the panel continuously between its leading edge and its trailing edge, cooperating to grip the upper and lower panel surfaces and thereby advance the panel progressively between such trim means, and panel edge supporting means comprising a plurality of hold-down rolls engageable with the top of the panel and arranged in two separate series along opposite sides of the upper belt, respectively, and two cooperable separate series of supporting rolls arranged in registry with the hold-down roll series, respectively, along opposite sides of the lower belt to engage the bottom of the panel.

2. Panel transport mechanism for panel trim apparatus having two spaced trim means for trimming opposite edges of a panel, comprising a carrier belt located substantially midway between such trim means and engageable by the lower surface of the panel from its leading edge to its trailing edge, two separate series of panel edge supporting rolls engageable by the lower surface of the panel and arranged, respectively, along opposite sides of said carrier belt, and a plurality of panel engaging means disposed above said carrier belt and said two roll series, respectively, engageable with the upper surface of a panel on said carrier belt and rolls and cooperating therewith to clamp the panel during edgewise movement thereof past the trim means.

3. Panel transport mechanism for panel trim apparatus having two spaced trim means for trimming opposite edges of a panel, comprising a carrier belt located substantially midway between such trim means and engageable by the lower surface of the panel from its leading edge to its trailing edge, panel engaging means disposed above said carrier belt, engageable with the upper surface of a panel on said carrier belt and cooperating therewith to clamp the panel during edgewise movement thereof past the trim means, and panel edge supporting means comprising a plurality of hold-down rolls engageable with the upper surface of the panel and arranged in two separate series at opposite sides of said panel engaging means, respectively, and two cooperable separate series of supporting rolls arranged in registry with the hold-down roll series, respectively, along opposite sides of said carrier belt and engageable with the lower surface of the panel.

4. Panel transport mechanism for panel trim apparatus having two spaced trim means for trimming opposite edges of the panel, comprising a carrier belt approximately midway between said trim means, engageable by the lower surface of the panel from its leading edge to its trailing edge and including panel contacting elements, guideways including an upwardly opening groove tapered in cross-section toward its bottom and extending lengthwise of said belt and therebeneath, a belt guiding element tapered complementally to said guideways, carried by said belt at the location of each panel contacting element and wedgingly engageable with said guideways groove for maintaining the respective panel contacting elements in accurate relationship to said guideways, and panel-supporting means disposed in horizontal registry with said panel-contacting elements and at opposite sides of said belt between it and each trim means.

ALFRED FRANK PIERCE.

References Cited in the file of this patent

UNITED STATES PATENTS

| Number | Name | Date |
|---|---|---|
| 68,819 | Weissenborn | Sept. 10, 1867 |
| 539,740 | Ingman | May 21, 1895 |
| 642,290 | Black | Jan. 30, 1900 |
| 794,874 | Mayhew | July 18, 1905 |
| 1,454,264 | Bonin | May 8, 1923 |
| 1,734,099 | Smith et al. | Nov. 5, 1929 |
| 1,811,201 | Kleineberg | June 23, 1931 |
| 1,816,485 | Johnson | July 28, 1931 |
| 1,833,470 | Olson | Nov. 24, 1931 |
| 1,863,908 | Madsen | June 21, 1932 |
| 1,919,964 | Spang | July 25, 1933 |
| 1,970,490 | Cooney | Aug. 14, 1934 |
| 2,117,641 | Westlund | May 17, 1938 |
| 2,160,307 | Cleveland | May 30, 1939 |
| 2,234,990 | Todhunter | Mar. 18, 1941 |
| 2,234,991 | Todhunter | Mar. 18, 1941 |
| 2,266,847 | Calpha et al. | Dec. 23, 1941 |
| 2,434,411 | Johnson | Jan. 13, 1948 |
| 2,501,299 | Anderson | Mar. 21, 1950 |